(12) United States Patent
Hofmann et al.

(10) Patent No.: US 8,091,926 B2
(45) Date of Patent: Jan. 10, 2012

(54) DEVICE FOR CONNECTING TWO DUCT ELEMENTS AND A BAFFLE IN AN AIRCRAFT AIR CONDITIONING SYSTEM

(75) Inventors: Oliver Hofmann, Dietenheim (DE); Alfred Huber, Aepfingen (DE); Jurijs Zambergs, Tornesch (DE)

(73) Assignee: Airbus Operations GmbH (DE)

( * ) Notice: Subject to any disclaimer, the term of this patent is extended or adjusted under 35 U.S.C. 154(b) by 66 days.

(21) Appl. No.: 12/472,144

(22) Filed: May 26, 2009

(65) Prior Publication Data

US 2010/0047013 A1 Feb. 25, 2010

Related U.S. Application Data

(60) Provisional application No. 61/057,440, filed on May 30, 2008.

(30) Foreign Application Priority Data

May 30, 2008 (DE) .......................... 10 2008 025 959

(51) Int. Cl.
*F16L 39/00* (2006.01)
(52) U.S. Cl. ..................... 285/129.1; 285/424; 285/924; 454/71
(58) Field of Classification Search ............... 285/129.1, 285/424, 924; 137/315.29; 138/94; 251/326, 251/328; 454/73, 71, 145, 152, 358
See application file for complete search history.

(56) References Cited

U.S. PATENT DOCUMENTS

| | | | | |
|---|---|---|---|---|
| 1,838,656 A * | 12/1931 | Bullock | ........................ | 251/327 |
| 2,271,138 A * | 1/1942 | Hamer | ............................. | 138/45 |
| 2,771,904 A * | 11/1956 | Sherman et al. | .............. | 251/328 |
| 2,823,887 A * | 2/1958 | Osinski | .......................... | 251/328 |
| 2,828,146 A * | 3/1958 | Abbey | .......................... | 251/328 |
| 2,925,244 A * | 2/1960 | Fox | ................................ | 251/328 |
| 3,105,620 A * | 10/1963 | Irving et al. | .................. | 251/328 |
| 3,860,038 A * | 1/1975 | Forni | ........................... | 138/94.3 |
| 4,128,107 A * | 12/1978 | Blumhardt | ..................... | 138/94 |
| 4,456,026 A * | 6/1984 | Kantor | .................... | 137/315.29 |
| 4,705,073 A * | 11/1987 | Beck | ........................ | 137/625.25 |
| 5,082,247 A * | 1/1992 | Owens et al. | ................. | 251/326 |
| 5,582,200 A * | 12/1996 | Kimpel et al. | ................ | 251/328 |
| 5,950,665 A * | 9/1999 | Claus | ............................ | 251/326 |
| 6,116,278 A * | 9/2000 | Baumgardner et al. | . | 137/625.25 |
| 7,325,442 B1 * | 2/2008 | Pampinella et al. | ............ | 138/94 |
| 7,497,772 B2 * | 3/2009 | Laib | .............................. | 454/71 |

FOREIGN PATENT DOCUMENTS

DE 10 2007 014 003 A1 10/2008

* cited by examiner

*Primary Examiner* — David E Bochna
(74) *Attorney, Agent, or Firm* — Barnes & Thornburg LLP

(57) ABSTRACT

A device (10) for connecting two duct elements (12, 14) and a baffle (34) in an aircraft air conditioning system may include first (30) and second (32) connecting flanges each connected to one of the two duct elements (12, 14), and at least one connecting element (38) formed on the first connecting flange (30) which interacts with at least one corresponding connecting element (40) formed on the second connecting flange (32) to establish the connection of the two duct elements (12, 14) and the baffle (34). The first (30) and/or second connecting flange (32) has/have an opening (44) for receiving the baffle (34), which is substantially disc-shaped and formed with at least one air passage (46, 48). The baffle (34) serves to control the flow of at least one air stream flowing through the connected duct elements (12, 14).

11 Claims, 4 Drawing Sheets

DEVICE FOR CONNECTING TWO DUCT ELEMENTS AND A BAFFLE IN AN AIRCRAFT AIR CONDITIONING SYSTEM

CROSS-REFERENCE TO RELATED APPLICATION

This application claims priority to U.S. Provisional Patent Application No. 61/057,440 filed May 30, 2008 and German patent Application No. 10 2008 025 959.4, filed May 30, 2008, which is incorporated by reference herein in its entirety.

The invention relates to a device for connecting two duct elements and a baffle in an aircraft air conditioning system.

BACKGROUND

Commercial aircraft in particular have an air conditioning system with corresponding air supply devices for air conditioning the aircraft interior, in particular the passenger cabin and the cockpit. In this connection a central air supply system controlled, for example, via the cockpit serves above all to constantly supply fresh air, which is necessary on account of the high passenger density in an aircraft cabin. The fresh air is taken as so called bleed air from the aircraft power unit and routed into the interior of the aircraft through air inlet openings. This hot fresh air is cooled to approximately 0° C. and dehumidified in a further step.

A fresh air stream of 0.55 lb/min of fresh air per passenger is required to ventilate the cabin according to the main requirements within safety-relevant regulations of the FAA (Federal Aviation Administration) and JAA (Joint Aviation Authorities). However the fresh air which is tapped off the aircraft power unit is not as a rule sufficient for this, therefore a proportion of used air (i.e. air from the interior of the aircraft, which has already been partly consumed by carried passengers through their respiratory process) is added by mixing to guarantee the required air speeds. This mixed air passes via an air distributor system via so-called "riser ducts" to the passenger areas in the top deck of the aircraft.

The admixture of used air also has the advantage of already being at the desired temperature and having a certain humidity due to the respiratory process of the passengers. If the conditioned fresh air is mixed with a certain proportion of used air, the mixed air which is supplied via the air supply system is felt to be more pleasant by the passengers, as it is less dry and warmer than the fresh air which is conditioned and dehumidified in a special unit. A further advantage which results from mixing used air and fresh air is to be seen in the fact that the proportion of fresh air which is required can be reduced by the proportion of supplied used air. As is known, by sucking in fresh air from the external environment of the aircraft, the aerodynamic drag of the aircraft increases. The fuel consumption of the aircraft is consequently also increased in accordance with the fresh air which is sucked in. The fuel consumption of a commercial aircraft can therefore be appreciably reduced by adding used air to fresh air by mixing.

As is known from the prior art, in order to control the mixing ratio of used air and fresh air in the riser ducts, a baffle is inserted between a first duct element to be connected and a second duct element to be connected of the riser ducts. In this case the first duct element comprises a feed line for used air (used air line) and a feed line for fresh air (fresh air line).

A device of this kind, which is known from the prior art, for connecting two duct elements is shown in FIGS. 1 to 3, in which a first duct element 12, a second duct element 14 as well as a baffle (not represented), which is inserted to regulate the air mixing ratio, are connected. For this purpose a respective flange (V-flange) 20, 22, which has a V-shaped cross section, is glued to each of the two areas to be connected of the first duct element 12 and the second duct element 14. The connection between the V-flanges 20, 22 is established by means of an aluminium clip 24.

The used air is supplied via a used air line 16 connected to the first duct element 12. However the fresh air is supplied via a fresh air line 18 connected to the first duct element 12.

A disadvantage known from the prior art of this duct connection lies in the fact that it represents a rigid connection without any tolerance compensation. This is to be attributed to the aluminium clip 24, which establishes a tight connection by applying a contact pressure force over the entire circumference of the V-flanges 20, 22. However undesirable stresses are introduced into the components through the applied contact pressure force if there are slight dimensional variations of the V-flanges 20, 22.

A further disadvantage which results from the duct connection represented in FIGS. 1 to 3 lies in the fact that, when calibrating the air conditioning system, the aluminium clip 24 must be completely dismantled and assembled again every time the baffle is changed. This leads to an increased assembly and dismantling expenditure and therefore to higher costs.

SUMMARY

The object of the present invention is therefore to eliminate the above-mentioned disadvantages and to provide a connection of the individual duct elements and the baffle which is simple and quick to assemble. In addition, a tight connection between the duct elements to be connected and the baffle is to be guaranteed.

This object is achieved by a device having the features of claim 1.

The device according to the invention serves to connect two duct elements and a baffle in an aircraft air conditioning system. The device comprises a first and a second connecting flange which are in each case connected to one of the two duct elements to be connected. In this respect the duct elements to be connected can be made of plastics material, composite materials, such as, for example, carbon fibre-reinforced plastics materials, of aluminium or the like, as is known from the prior art. At least one connecting means is also formed on the first connecting flange, which means interacts with at least one corresponding connecting means formed on the second connecting flange to establish the connection of the two duct elements and the baffle. The first and/or second connecting flange has/have an opening for receiving the baffle, which is substantially disc-shaped and formed with at least one air passage.

In this respect the baffle is adapted to control the flow of at least one air stream flowing through the connection. As is already known from the prior art, the first duct element can comprise a fresh air line as well as a used air line. In this case the baffle serves in particular to control the mixing ratio of fresh air with used air. However it is alternatively also conceivable for the first duct element to comprise just one air line, e.g. a fresh air line, and for the flow of supplied air to be controlled with the aid of the baffle.

Each of the connecting flanges can be formed integrally with the duct element or, as is known from the prior art, be connected by gluing to the duct elements to be connected. Alternative joining processes, such as soldering, welding or the like, are equally conceivable. The connecting flanges can be made of aluminium, but also of other materials, such as, for example, of other metals or of plastics material. The use of elastic plastics materials in particular offers the advantage of promoting a tight duct connection on account of the material properties. In addition, dimensional tolerances of the parts to be connected which occur in the case of slight elastic deformability of the connecting flanges can be compensated.

Since the first and/or second connecting flange have/has an opening for receiving the baffle and the baffle is substantially disc-shaped, the baffle can be inserted in the device at the side. The opening for receiving the baffle is adapted to the outer contour of the baffle which is to be received. It may be favourable to provide just one of the connecting flanges with an opening for the baffle which is to be received, although it is equally conceivable for the opening to be applied in an overlap area (defined in detail in the following) of the connecting flanges of the duct connection. The connection between the actual duct elements can be improved in this way through the inserted baffle.

In one development of the invention the duct connection can have a seal which is disposed between the first and second connecting flange. In this case this may be, for example, a circumferential ring seal. However the seal may alternatively also comprise a plurality of sealing elements. The seal serves both for sealing the duct connection and for tolerance compensation when there are slight dimensional variations. The seal is preferably made of a resiliently elastic material. A resiliently elastic seal has the advantage of enabling the two connecting flanges to be connected to be biased towards one another with the aid of the seal, which, depending on the formation of the connecting means, can stabilise the connection of the connecting flanges in an advantageous manner.

It is also possible for the connecting flanges to axially overlap at least partly in an overlap area. For this purpose the second connecting flange can be inserted at least partly in the first connecting flange or vice versa. The seal may also be disposed at least in sections in the overlap area between the inner circumferential surface of the outer and the outer circumferential surface of the inner connecting flange.

The connecting means may also comprise two pins or the like which are disposed on the first connecting flange and lie substantially opposite one another. The connecting means may alternatively comprise more than two pins which are distributed over the circumference of the first connecting flange. The pins can be evenly or unevenly spaced apart from one another.

The corresponding connecting means can also comprise a fastening strap. A fastening strap of this kind forms a projection of the connecting flange to which it is applied and from which it protrudes. It is also possible for the corresponding connecting means applied to the second connecting flange to have at least one opening for receiving the connecting element applied to the first connecting flange. In an embodiment of this kind the connecting means is formed, for example, by a pin, a projection or the like which is received in the opening of the receiving corresponding connecting element.

However the corresponding connecting means could alternatively also comprise at least one strap with a section which extends radially inwards from the second connecting flange, i.e. into the area which is enclosed by the connecting flange, and engages in the connecting means, which is formed as a receiving depression or bore, of the first connecting flange.

The connecting means is advantageously formed so as to be resiliently deformable. This is favourable, for example, when the corresponding connecting means comprises an opening for receiving the connecting element. In this case the corresponding connecting means having an opening deforms until the connecting means, for example in the form of a pin, enters the opening. The resilient connecting means then snaps back like a snap-action connection and forms a positive fit connection with the corresponding connecting means. In this respect the opening for receiving the connecting means can also be of a larger diameter than the connecting means which is to be received.

The baffle may also have a terminal edge, i.e. a lateral edge of the baffle, which is also visible from outside in the installed state when the baffle is installed between the duct elements. The terminal edge has a cross-sectional profile which is formed to engage in a sealing manner with a mating profile, which corresponds in cross section and is formed in the area of the opening, and thereby to obtain a sealing action.

In a further embodiment the sealing terminal edge of the baffle can have a fastening means with a locking element which engages in a corresponding recess which is applied in the area of the opening receiving the baffle. Handling of the baffle is significantly simplified with the aid of this fastening means, as no additional tool is required either to fix or to remove the inserted baffle. The fastening means may, for example, be in the form of a gripping strap or the like. The locking element which is provided on the fastening means engages in a corresponding recess in the area of the opening receiving the baffle and thereby prevents a release movement against the direction of introduction of the baffle. The baffle is fixed in the inserted position.

In one development of the invention the fastening means is formed so as to be resiliently deformable to particular advantage. By raising or lowering the resilient fastening means, the locking element can be released from the recess and the fixing action can be easily and quickly terminated if, for example, the baffle is to be replaced.

BRIEF DESCRIPTION OF THE DRAWINGS

An embodiment of the invention is illustrated in detail in the following on the basis of the accompanying schematic figures, which represent.

DESCRIPTION OF THE ILLUSTRATIVE EMBODIMENTS

Figure 1:
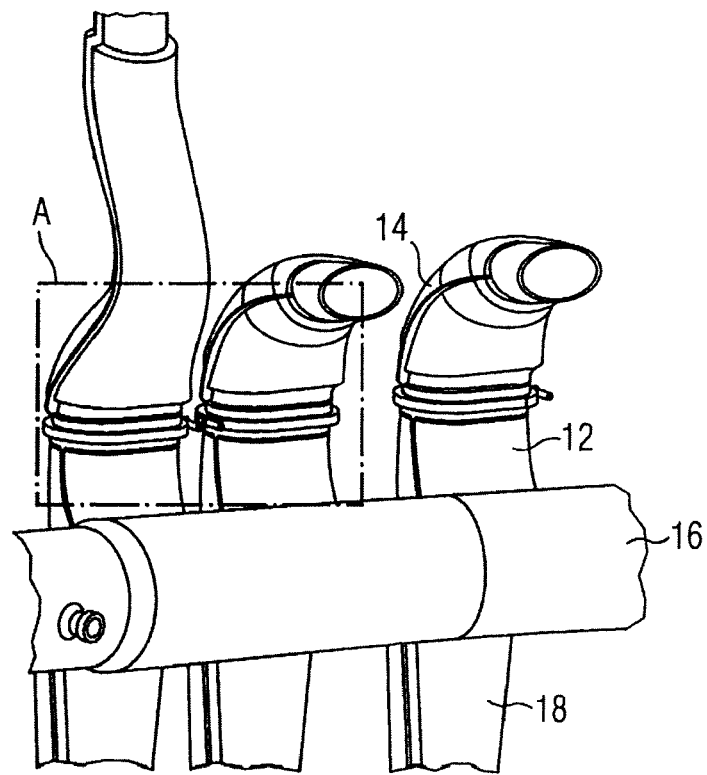
FIG. 1 a perspective view of an air distribution system with duct connections according to the prior art, FIG. 2 a perspective detail view of the detail A of a duct connection according to FIG. 1, FIG. 3 a perspective detail view of the detail B of a duct connection according to FIG. 2, FIG. 4 a perspective view of a duct connection according to the invention partly in an assembled state, partly in an exploded representation, FIG. 5 a sectional view of the duct connection according to the invention according to FIG. 4, FIG. 6 a part-sectional perspective view of the duct connection according to the invention of FIG. 4, and FIG. 7 a perspective detail view of the detail D of a duct connection from FIG. 5.
Figure 2:
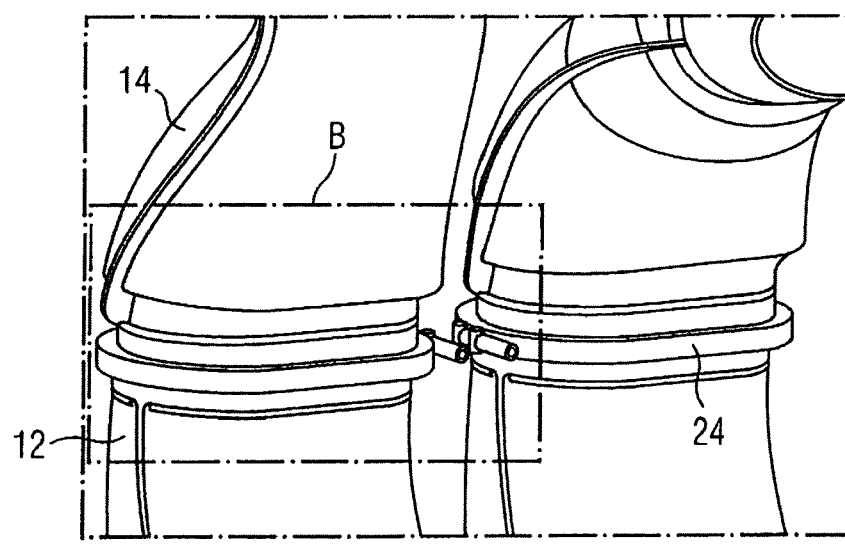
Figure 3:
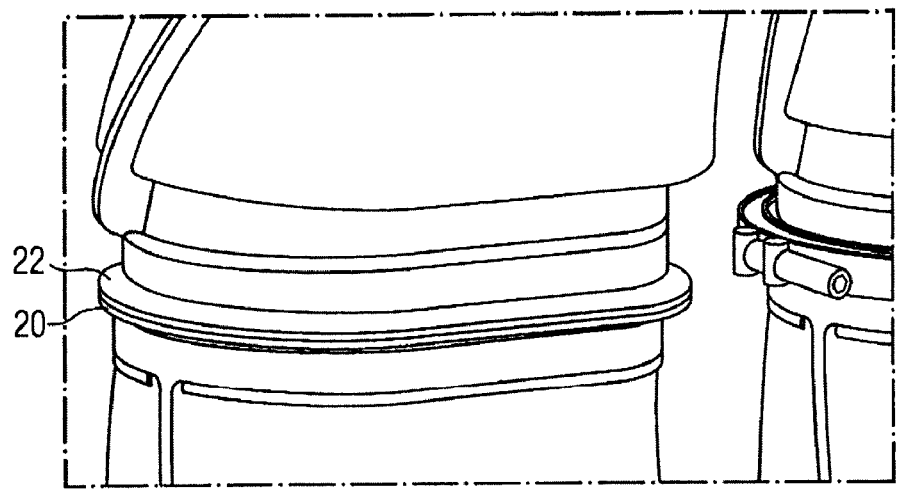

An air distributor system with a device for connecting two duct elements, as is known from the prior art, is shown in FIGS. 1 to 3, as already explained in detail at the beginning of this description. The device connects a first duct element 12 to a second duct element 14. The duct element 12 comprises a used air line 16 and a fresh air line 18. A baffle (not represented) is also disposed between the first duct element 12 and the second duct element 14. In the prior art a respective aluminium V-flange 20, 22 is glued to the two ends to be connected of the first duct element 12 and second duct element 14. The baffle is inserted in these aluminium V-flanges 20, 22. Here the baffle serves to adapt the air mixing ratio of the mixed air M (cf. FIG. 5), i.e. the ratio between the supplied fresh air F and the supplied used air B. The connection between the V-flanges 20, 22 is established by means of an aluminium clip 24 embracing the latter. This aluminium clip 24 pushes the two V-flanges 20, 22 together and establishes a tight connection through the resulting surface pressure.

As can also be seen from FIGS. 1 to 3, the aluminium clip 24 must be dismantled every time the baffle is changed, for instance when calibrating the air conditioning device, in order to remove the inserted baffle and to insert another baffle.

The aluminium clip is represented in detail in FIG. 2, while a detail view of the V-flanges 20 and 22 without the encircling aluminium clip 24 is represented in FIG. 3.

Figure 4:
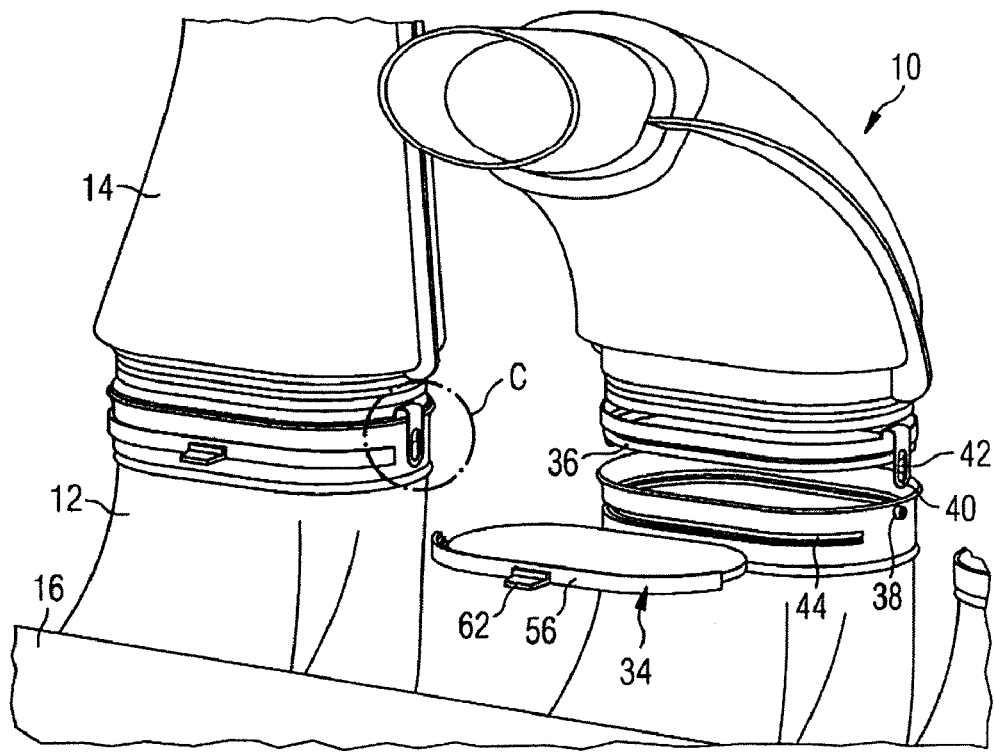

A device 10 according to the invention for connecting two duct elements is now shown in FIG. 4. The same reference characters are used as in FIGS. 1 to 3.

The device 10 likewise connects a first duct element 12 to a second duct element 14 and a baffle 34. The duct elements 12 and 14 are formed in the same way as the duct elements which are known from the prior art. The duct element 12 is connected to a used air line 16 and a fresh air line 18 (cf. also FIG. 6).

A first connecting flange 30 is fixed to the first duct element 12, which flange, for example, as is known from the prior art, can be connected to the first duct element 12 by means of gluing. However, depending on the material which is selected for the first connecting flange 30, alternative joining methods are also conceivable, for example soldering or welding. The second connecting flange 32 is connected to an end area of the second duct element 14 in the same way.

At its outer circumferential surface the first connecting flange 30 has two pins which protrude radially as connecting means 38 from the outer circumferential surface of the first connecting flange 30. The two pins are disposed substantially opposite to one another. The cross section of the first and second duct element 12 and 14 is substantially elliptical in the connecting area, as previously in the case of the duct elements known from the prior art, with the pins lying in the area of the major vertex of the ellipse and therefore being disposed at the greatest possible spacing from one another. However alternative arrangement possibilities, for example in the area of the minor vertex (with the smallest possible spacing of two opposite points) are just as conceivable as the arrangement of just one pin or a plurality of pins, for example three, four or more. The pins can be disposed at equal spacings from one another, although it may also be appropriate to vary the spacings between the individual pins.

The corresponding connecting means 40 in the form of fastening straps is disposed on the second connecting flange 32, these straps having an opening 42 for receiving the pins. It is conceivable for a fastening strap to be associated with each pin, as shown in FIG. 4, detail C. However it is alternatively also conceivable for a fastening strap to have an opening 42 for receiving a plurality of pins or a plurality of openings 42.

A seal 36 is also disposed on the second connecting flange 32 on its front side which faces the first connecting flange 30. This laps over the front face of the second connecting flange 32 and thus lies in a sealing manner both against the inside and against the outside of the connecting flange 32 (cf. also FIG. 5). In the assembled state the seal 36 lies at least in sections in a sealing manner against the inner circumferential surface of the first connecting flange 30 and the outer circumferential surface of the second connecting flange 32.

Figure 7:
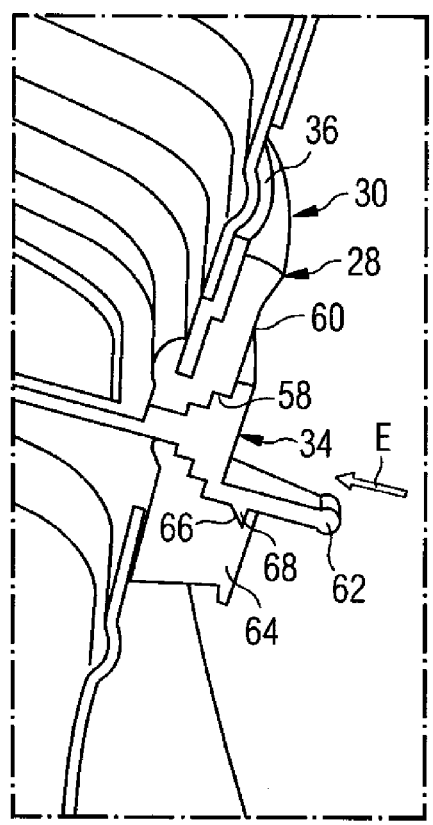

FIG. 4, as also the detail view in FIG. 7, additionally show the baffle 34, which can be inserted in the first connecting flange 30 through a slotted opening 44. For simplified handing the baffle 34 has a gripping strap which also serves as a fastening means 62 at its front side, which is also accessible in the installed state. The inserted baffle 34 can easily be withdrawn from the opening 44 and replaced by a new baffle or fixed in the opening 44, as explained in the following, by way of this fastening means 62.

Figure 5:
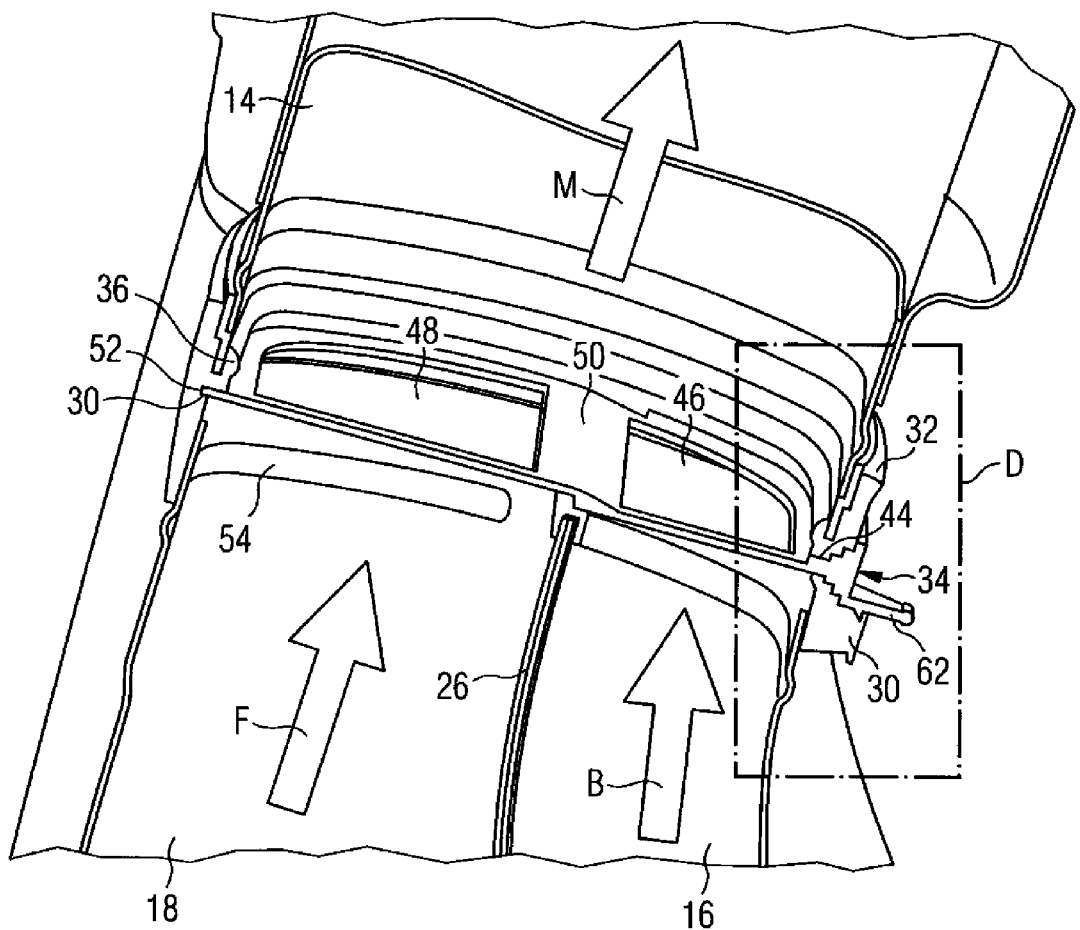

As shown more clearly in FIG. 5, the first connecting flange 30 also has at its inner circumferential surface a circumferential groove 52 which lies substantially in one plane with the opening 44 and serves as a guide and support for the baffle 34. In the represented embodiment the first connecting flange 30 also comprises a central web 54 which, when the baffle 34 is inserted, serves as a support seat and lies on the partition wall 26 between the used air line 16 and the fresh air line 18.

In the embodiment which is represented in FIG. 5 the baffle 34 has two through-openings 46 and 48 as well as a separating web 50 lying in between. The mixing ratio between used air and fresh air is determined by the size of the through-openings 46 and 48. As shown in FIG. 5, the separating web 50 is supported against the central web 54 of the first connecting flange 30.

In the installed state (cf. FIG. 4) the baffle 34 has a terminal edge 56 which is visible when the baffle 34 is inserted in the opening 44. In order to guarantee a tight duct connection, the terminal edge 40 has a stepped profile in its cross section, as shown in FIG. 7, which engages with a corresponding stepped profile at the receiving opening 44 of the first connecting flange 30.

The first connecting flange 30 additionally comprises at its outer circumferential surface in the area of the opening 44 a projection 64 which has a locking recess 66. A corresponding locking element 68, which is applied to the facing side of the fastening means 62, can be inserted in this recess and serves as a stop which prevents the baffle 34 from moving in a direction opposite to the direction of introduction E of the baffle 34. It is in this way possible to ensure that the baffle does not unintentionally become disengaged from the opening 44 of the first connecting flange 30, but forms a sealing connection of the duct elements 12 and 14 with the connecting flanges 30 and 32.

The fastening means 62 is also formed in a resilient manner, so that the locking element 68 can be released from the recess 66 through a movement of the fastening means 62 in a direction which points away from the projection 64 of the first connecting flange 30.

Figure 6:
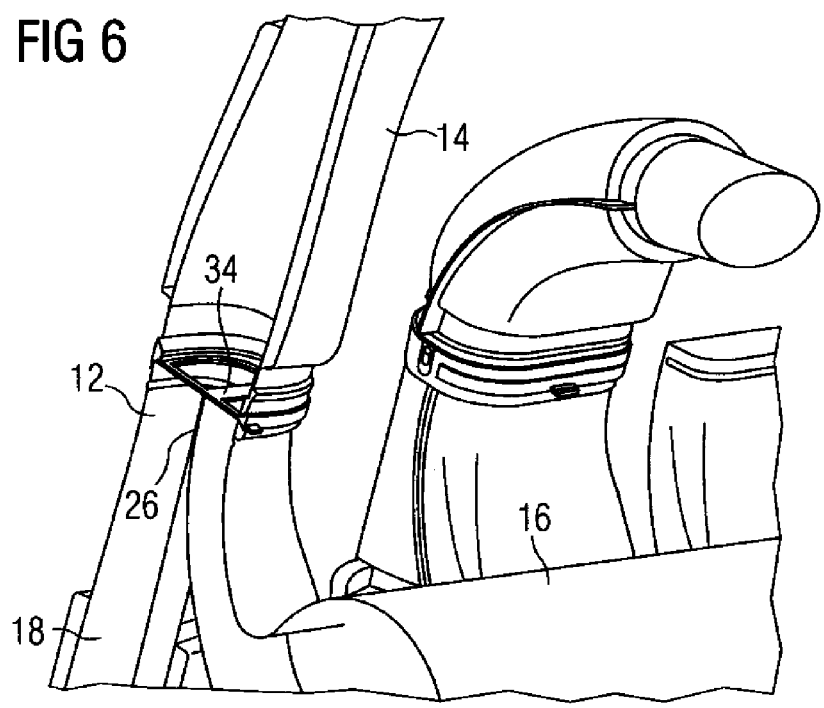

Finally, FIG. 6 shows the connection of the used air line 16 and the fresh air line 18 to the first duct element 12.

The invention claimed is:

1. A device configured to connect two duct elements and a baffle in an aircraft air conditioning system, the device comprising:

the baffle, wherein the baffle is formed to control the flow of at least one air stream flowing through the connection, a first connecting flange configured to be connected to a first of the two duct elements to be connected, and a second connecting flange configured to be connected to a second of the two second duct elements, wherein at least a first connecting means is formed on the first connecting flange, which first connecting means interacts with at least a second connecting means formed on the second connecting flange to establish a connection of the two duct elements and the baffle, wherein the baffle is substantially disc-shaped and formed with at least one air passage, wherein at least one of the first and the second connecting flange has an opening for receiving the baffle, and wherein the second connecting means comprises at least one fastening strap.

2. The device according to claim 1, further comprising a seal which is disposed between the first and second connecting flanges.

3. The device according to claim 2, wherein the seal is made of a resiliently elastic material.

4. The device according to claim 1, wherein the first and second connecting flanges axially overlap at least partly in an overlap area.

5. The device according to claim 4, wherein a seal is disposed in the overlap area between inner and outer circumferential surfaces of the first and second connecting flanges.

6. The device according to claim 1, wherein the first connecting means comprises at least two pins which are disposed on the first connecting flange and lie substantially opposite one another.

7. The device according to claim 1, wherein the second connecting means has at least one opening for receiving the first connecting means.

8. The device according to claim 1, wherein the second connecting means is formed so as to be resiliently deformable.

9. The device according to claim 1, wherein the baffle has a terminal edge which has a cross-sectional profile which is formed to engage in a sealing manner with a mating profile which corresponds in cross section and is formed in the area of the opening of the at least one of the first and second connecting flame.

10. The device according to claim 9, wherein the terminal edge of the baffle has a fastening means with a locking element which engages in a corresponding recess which is applied in the area of the opening receiving the baffle.

11. The device according to claim 10, wherein the fastening means is formed so as to be at least partly resiliently deformable.

* * * * *